US009828899B2

(12) United States Patent
Nagaoka et al.

(10) Patent No.: US 9,828,899 B2
(45) Date of Patent: Nov. 28, 2017

(54) EXHAUST GAS PURIFICATION SYSTEM AND EXHAUST GAS PURIFICATION METHOD

(71) Applicant: ISUZU MOTORS LIMITED, Tokyo (JP)

(72) Inventors: Daiji Nagaoka, Kamakura (JP); Hiroyuki Yuza, Yokohama (JP); Teruo Nakada, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/911,150

(22) PCT Filed: Sep. 29, 2014

(86) PCT No.: PCT/JP2014/075874
§ 371 (c)(1),
(2) Date: Feb. 9, 2016

(87) PCT Pub. No.: WO2015/046508
PCT Pub. Date: Apr. 2, 2015

(65) Prior Publication Data
US 2016/0201587 A1    Jul. 14, 2016

(30) Foreign Application Priority Data
Sep. 30, 2013  (JP) ................................. 2013-203842

(51) Int. Cl.
*F01N 3/00*        (2006.01)
*F01N 11/00*       (2006.01)
(Continued)

(52) U.S. Cl.
CPC .......... *F01N 11/002* (2013.01); *F01N 3/0814* (2013.01); *F01N 3/0842* (2013.01);
(Continued)

(58) Field of Classification Search
USPC ........................... 60/274, 286, 297, 301, 295
See application file for complete search history.

(56) References Cited

U.S. PATENT DOCUMENTS

| | | | |
|---|---|---|---|
| 6,925,797 B2* | 8/2005 | Taga ..................... | F01N 3/0842 60/276 |
| 7,111,451 B2* | 9/2006 | Dou ...................... | F01N 3/0814 60/276 |

(Continued)

FOREIGN PATENT DOCUMENTS

| | | |
|---|---|---|
| DE | 10 2004 058 680 A1 | 6/2006 |
| EP | 0 829 623 A1 | 3/1998 |

(Continued)

OTHER PUBLICATIONS

International Search Report dated Dec. 22, 2014 in corresponding International Application No. PCT/JP2014/075874.

*Primary Examiner* — Binh Q Tran
(74) *Attorney, Agent, or Firm* — Staas & Halsey LLP

(57) ABSTRACT

When a catalyst temperature of a catalyst device is at or below a lower limit air-fuel ratio richness control is prohibited. When a first timing, where an estimated value of a NOx storage amount has reached an enrichment start threshold value, and a second timing, based on a set interval time in an enrichment interval time map, are both satisfied, the control is started. The second timing is corrected by multiplying the set interval time by an enrichment interval correction coefficient preset based on the catalyst temperature and a storage ratio of the estimated value of the NOx storage amount to an enrichment start threshold value of the NOx storage amount. The frequency of the air-fuel ratio richness control of a catalyst device configured to recover a purification capacity of a catalyst is reduced, and the catalyst temperature is raised while preventing white smoke development and hydrocarbon slip, to thereby achieve improve- (Continued)

ment in exhaust gas composition and improvement in fuel efficiency.

4 Claims, 4 Drawing Sheets

(51) Int. Cl.
  *F01N 3/10* (2006.01)
  *F01N 3/20* (2006.01)
  *F01N 3/36* (2006.01)
  *F02D 41/02* (2006.01)
  *F01N 3/08* (2006.01)
  *F01N 9/00* (2006.01)

(52) U.S. Cl.
  CPC ........... *F01N 3/0871* (2013.01); *F01N 3/108* (2013.01); *F01N 3/20* (2013.01); *F01N 3/206* (2013.01); *F01N 3/36* (2013.01); *F01N 9/00* (2013.01); *F02D 41/024* (2013.01); *F02D 41/0275* (2013.01); *F01N 2250/12* (2013.01); *F01N 2260/04* (2013.01); *F01N 2430/06* (2013.01); *F01N 2560/06* (2013.01); *F01N 2610/03* (2013.01); *F01N 2900/1602* (2013.01); *F01N 2900/1614* (2013.01); *F02D 2200/0802* (2013.01); *F02D 2200/0806* (2013.01); *Y02T 10/26* (2013.01); *Y02T 10/47* (2013.01)

(56) References Cited

U.S. PATENT DOCUMENTS

| | | | | |
|---|---|---|---|---|
| 7,275,363 | B2 * | 10/2007 | Miura | F01N 3/0842 60/276 |
| 7,673,445 | B2 * | 3/2010 | Goralski, Jr. | F01N 3/0814 60/274 |
| 8,209,954 | B2 * | 7/2012 | Yoshida | B01D 53/9418 60/285 |
| 2002/0029562 | A1 * | 3/2002 | Ishii | F01N 3/0842 60/277 |
| 2005/0076635 | A1 * | 4/2005 | Suyama | F01N 3/0871 60/276 |
| 2011/0041479 | A1 | 2/2011 | Nagaoka et al. | |

FOREIGN PATENT DOCUMENTS

| | | |
|---|---|---|
| EP | 1 176 289 A2 | 7/2001 |
| FR | 2 840 957 | 12/2003 |
| JP | 11-270382 | 10/1999 |
| JP | 2000-230421 | 8/2000 |
| JP | 2002-106332 | 4/2002 |
| JP | 2003-65108 | 3/2003 |
| JP | 2005-127288 | 5/2005 |
| JP | 2005-291098 | 10/2005 |
| JP | 2009-270446 | 11/2009 |

* cited by examiner

EXHAUST GAS PURIFICATION SYSTEM AND EXHAUST GAS PURIFICATION METHOD

CROSS-REFERENCE TO RELATED APPLICATIONS

This application is a U.S. National Stage Application, which claims the benefit under 35 U.S.C. §371 of PCT International Patent Application No. PCT/JP2014/075874, filed Sep. 29, 2014, which claims the foreign priority benefit under 35 U.S.C. §119 of Japanese Patent Application No. 2013-203842, filed Sep. 30, 2013, the contents of which are incorporated herein by reference.

TECHNICAL FIELD

The present invention relates to an exhaust gas purification system and an exhaust gas purification method therefore which make it possible to reduce the frequency of the air-fuel ratio richness control and raise the catalyst temperature while preventing white smoke and hydrocarbon ("HC") slip, to thereby achieve improvement in exhaust gas composition and fuel efficiency, in an exhaust gas purification system including a catalyst device configured to recover a purification capacity of a catalyst by an air-fuel ratio richness control.

BACKGROUND ART

In general, a vehicle travels by transmitting a power generated by combusting fuel in an internal combustion engine to the wheels through a transmission and the like. The exhaust gas generated by the combustion contains NOx (nitrogen oxides), PM (particulate matter), and the like, and hence should not be released directly to the atmosphere. In this respect, an after treatment device for exhaust gas is provided in an exhaust passage of an internal combustion engine, and a catalyst device supporting a catalyst is provided in the after treatment device. With this catalyst device, a purification treatment is performed on NOx, PM, and the like contained in the exhaust gas. As a catalyst device for purifying NOx, for example, a NOx storage reduction-type catalyst (LNT: lean NOx trap) or a selective reduction-type NOx catalyst (SCR: selective catalytic reduction) is used.

When a vehicle travels normally, i.e, when the air-fuel ratio of the exhaust gas is in a lean state, the NOx storage reduction-type catalyst device oxidizes NO contained in the exhaust gas to $NO_2$ and stores the $NO_2$. When the amount of NOx stored approaches a storage limit, an air-fuel ratio richness control for placing the air-fuel ratio of the exhaust gas in a rich state is performed to release the amount of NOx stored and also reduce the released NOx.

To place the air-fuel ratio of the exhaust gas in a rich state in this air-fuel ratio richness control, post injection is performed based on in-cylinder fuel injection, or fuel is directly injected into the exhaust gas from a fuel injection device provided in the exhaust passage. In this manner, the amount of HCs in the exhaust gas is increased temporarily, and the HCs are combusted with oxygen in the exhaust gas to place the exhaust gas in a rich state.

In addition, an enrichment interval at which the air-fuel ratio richness control is performed is determined based on a timing at which an estimated value (calculated value) of a NOx storage amount has reached an enrichment start threshold value set in association with a storage limit value, a timing based on an elapsed time specified in an enrichment interval time map (base enrichment interval map) regarding the time elapsed from the last air-fuel ratio richness control to the next air-fuel ratio richness control, or the like.

Meanwhile, a continuation time for which a rich state is continued in a single execution of the air-fuel ratio richness control is determined based on a timing where an estimated value (calculated value) of the NOx reduction amount has reached an enrichment finish threshold value (target reduction amount threshold value), or on a timing based on a time specified in an enrichment continuation time map regarding a time elapsed from the start of the air-fuel ratio richness control, or the like.

However, during warming-up immediately after the ignition of the engine or the like, the combustion in a cylinder in the rich state tends to be unstable, and hence a situation arises in which the air-fuel ratio richness control cannot be performed, although the NOx storage amount becomes not smaller than the threshold value.

For this reason, in a situation where the NOx storage amount is not smaller than the threshold value, a conventional technology employs a control as shown in FIG. 4. Specifically, the air-fuel ratio richness control is prohibited, until the warming-up of the internal combustion engine is finished. The prohibition of the air-fuel ratio richness control is withdrawn after completion of the warming-up. In addition, immediately after the withdrawal of the prohibition, the air-fuel ratio richness control is performed frequently at short intervals to release the excessively stored NOx and purify the NOx by reduction. In this manner, the state where the NOx purification rate is deteriorated is altered, as soon as possible.

However, when the air-fuel ratio richness control is performed at such short intervals in a state where the catalyst temperature is low immediately after the ignition during traveling on an actual road, HCs are excessively supplied to the exhaust passage by the air-fuel ratio richness control performed frequently, which causes a problem of white smoke development. In addition, when the temperature of the catalyst is low, the chemical reaction rate of the catalyst is low. Hence, when the air-fuel ratio richness control is performed with a low catalyst temperature in the same manner as in an ordinary case, there arises such a problem that the redox reaction of the HCs is so insufficient that an HC slip occurs in which the excessive HCs are released to the atmosphere.

In this respect, for example, as described in Japanese patent application Kokai publication No. 2009-270446, an exhaust gas purification method and an exhaust gas purification system have been proposed which achieve an improvement in terms of the release of HCs to the atmosphere as follows. Specifically, a HC-adsorbing member for adsorbing HCs in exhaust gas is provided in an exhaust passage of an internal combustion engine on a downstream side of a NOx storage reduction-type catalyst. At a NOx regeneration control, when an index temperature indicative of the temperature of the HC-adsorbing member is not higher than a first judgment temperature, the air-fuel ratio of the exhaust gas is set at 0.8 to 1.1 in terms of air excess ratio, when the index temperature is between the first judgment temperature and a second judgment temperature, the air-fuel ratio of the exhaust gas is set at 1.0 to 1.1 in terms of air excess ratio, and when the index temperature is at or above the second judgment temperature, the air-fuel ratio of the exhaust gas is set at 0.8 to 1.1 in terms of air excess ratio.

PRIOR ART DOCUMENT

Patent Document 1: Japanese patent application Kokai publication No. 2009-270446

SUMMARY OF THE INVENTION

The present invention has been made in view of the above-described matters, and an object of the present invention is to provide an exhaust gas purification system and an exhaust gas purification method therefor which provide more appropriate determination criteria for determining the start or finish of the air-fuel ratio richness control according to an operation state of an internal combustion engine and thus which make it possible to reduce the frequency of the air-fuel ratio richness control and raise the catalyst temperature while preventing the white smoke development and the HC slip, to thereby achieve improvement in exhaust gas composition and improvement in fuel efficiency, in an exhaust gas purification system including a catalyst device configured to recover a purification capacity of a catalyst by an air-fuel ratio richness control.

An exhaust gas purification system of the present invention for achieving the above-described object is an exhaust gas purification system including:

a catalyst device provided in an exhaust passage of an internal combustion engine and configured to recover a purification capacity of a catalyst by an air-fuel ratio richness control; and a controlling device configured to perform the air-fuel ratio richness control, wherein the controlling device is configured to prohibit the air-fuel ratio richness control, when a catalyst temperature is at or below a preset lower limit catalyst temperature, start the air-fuel ratio richness control, when a first timing where an estimated value of a NOx storage amount has reached a preset enrichment start threshold value and a second timing based on a set interval time set in an enrichment interval time map are both satisfied, and preset an enrichment interval correction coefficient based on the catalyst temperature of the catalyst device and on a storage ratio of the estimated value of the NOx storage amount to an enrichment start threshold value of the NOx storage amount, and correct the second timing by multiplying the set interval time by the enrichment interval correction coefficient.

According to this configuration, the enrichment interval correction coefficient based on the catalyst temperature of the catalyst device and on the storage ratio of the estimated value of the NOx storage amount to the enrichment start threshold value of the NOx storage amount is introduced in the exhaust gas purification system in which the purification capacity of the catalyst (NOx storage reduction-type catalyst or the like) in the catalyst device is recovered by the air-fuel ratio richness control. This introduction makes it possible to perform the air-fuel ratio richness control at enrichment intervals optimized based on mutual relationships among the estimated value of the NOx storage amount, the catalyst temperature, and the enrichment interval, without performing determinations related to the estimated value of the NOx storage amount, the catalyst temperature, and the enrichment interval each independently.

In the above-described exhaust gas purification system, the controlling device may be configured to finish the air-fuel ratio richness control, when a continuation time for which the rich state is continued after the start of the air-fuel ratio richness control satisfies both a third timing where an estimated value of a NOx reduction amount has reached an enrichment finish threshold value and a fourth timing where a set continuation time specified in an enrichment continuation time map has elapsed, and correct the fourth timing by multiplying the set continuation time by a continuation time correction coefficient set according to the catalyst temperature. In such a case, the continuation time of the air-fuel ratio richness control can be changed in an optimized manner according to the catalyst temperature of the catalyst device and the reaction rate of the catalyst which depends on the catalyst temperature, and the air-fuel ratio richness control can be performed more appropriately.

In the above-described exhaust gas purification system, the controlling device may be configured to set the enrichment interval correction coefficient to be larger as the catalyst temperature gets lower, and to be larger as the storage ratio gets lower, and set the continuation time correction coefficient to be larger as the catalyst temperature gets lower. With this configuration, when a situation where the combustion in the cylinder becomes unstable, for example, during warming-up of the internal combustion engine or the like in a situation where the air-fuel ratio richness control is prohibited because of the temperature of the catalyst changes to a situation where the catalyst temperature rises and the air-fuel ratio richness control can be performed, long intervals are provided for the air-fuel ratio richness control, and the frequency of the air-fuel ratio richness control can be reduced. This makes it possible to prevent the excessive supply of HCs to the exhaust passage and the white smoke development due to the excessive supply.

In addition, when the temperature of the catalyst is low, a long continuation time of the air-fuel ratio richness control is set. Hence, it is possible to prevent the HC slip where the redox reaction of the HCs supplied to the exhaust passage is so insufficient that the excessive HCs are released to the atmosphere.

Meanwhile, an exhaust gas purification method of the present invention for achieving the above-described object is an exhaust gas purification method, in which a purification capacity of a catalyst in a catalyst device provided in an exhaust passage of an internal combustion engine is recovered by an air-fuel ratio richness control, the method including:

prohibiting the air-fuel ratio richness control, when a catalyst temperature is at or below a preset lower limit catalyst temperature;

starting the air-fuel ratio richness control, when a first timing where an estimated value of a NOx storage amount has reached a preset enrichment start threshold value and a second timing based on a set interval time set in an enrichment interval time map are both satisfied; and correcting the second timing by multiplying the set interval time by an enrichment interval correction coefficient preset based on the catalyst temperature of the catalyst device and on a storage ratio of the estimated value of the NOx storage amount to an enrichment start threshold value of the NOx storage amount.

In addition, in the above-described exhaust gas purification method, the air-fuel ratio richness control is finished, when a continuation time for which the rich state is continued after the start of the air-fuel ratio richness control satisfies both a third timing where an estimated value of a NOx reduction amount has reached an enrichment finish threshold value and a fourth timing where a set continuation time specified in an enrichment continuation time map has elapsed, and the fourth timing is corrected by multiplying the set continuation time by a continuation time correction coefficient set according to the catalyst temperature.

Moreover, in the above-described exhaust gas purification method, the enrichment interval correction coefficient is set to be larger as the catalyst temperature gets lower, and to be larger as the storage ratio gets lower, and the continuation time correction coefficient is set to be larger as the catalyst temperature gets lower.

Each of these exhaust gas purification methods can achieve the same effect as that achieved by the above-described exhaust gas purification system.

According to the exhaust gas purification system and the exhaust gas purification method of the present invention, the enrichment interval correction coefficient based on the catalyst temperature of the catalyst device and on the storage ratio of the estimated value of the NOx storage amount to the enrichment start threshold value of the NOx storage amount is introduced in an exhaust gas purification system in which a NOx storage reduction-type catalyst or the like is supported, and the purification capacity of the catalyst in a catalyst device is recovered by an air-fuel ratio richness control. This introduction makes it possible to perform the air-fuel ratio richness control at an enrichment interval optimized based on mutual relationships among the estimated value of the NOx storage amount, the catalyst temperature, and the enrichment interval, without performing determinations related to the estimated value of the NOx storage amount, the catalyst temperature, and the enrichment interval each independently.

Moreover, the introduction of the continuation time correction coefficient set according to the catalyst temperature makes it possible to optimize the continuation time, for which the rich state is continued, according to the catalyst temperature of the catalyst device, and the reaction rate of the catalyst which depends on the catalyst temperature, so that the air-fuel ratio richness control can be performed more appropriately.

Consequently, more appropriate determination criteria according to an operation state of an internal combustion engine can be provided for determining the start or finish of the air-fuel ratio richness control in an exhaust gas purification system including a catalyst device configured to recover a purification capacity of a catalyst by an air-fuel ratio richness control. This makes it possible to reduce the frequency of the air-fuel ratio richness control and raise the catalyst temperature while preventing the white smoke development and the HC slip, to thereby achieve improvement in exhaust gas composition and improvement in fuel efficiency.

DETAILED DESCRIPTION

Figure 1:
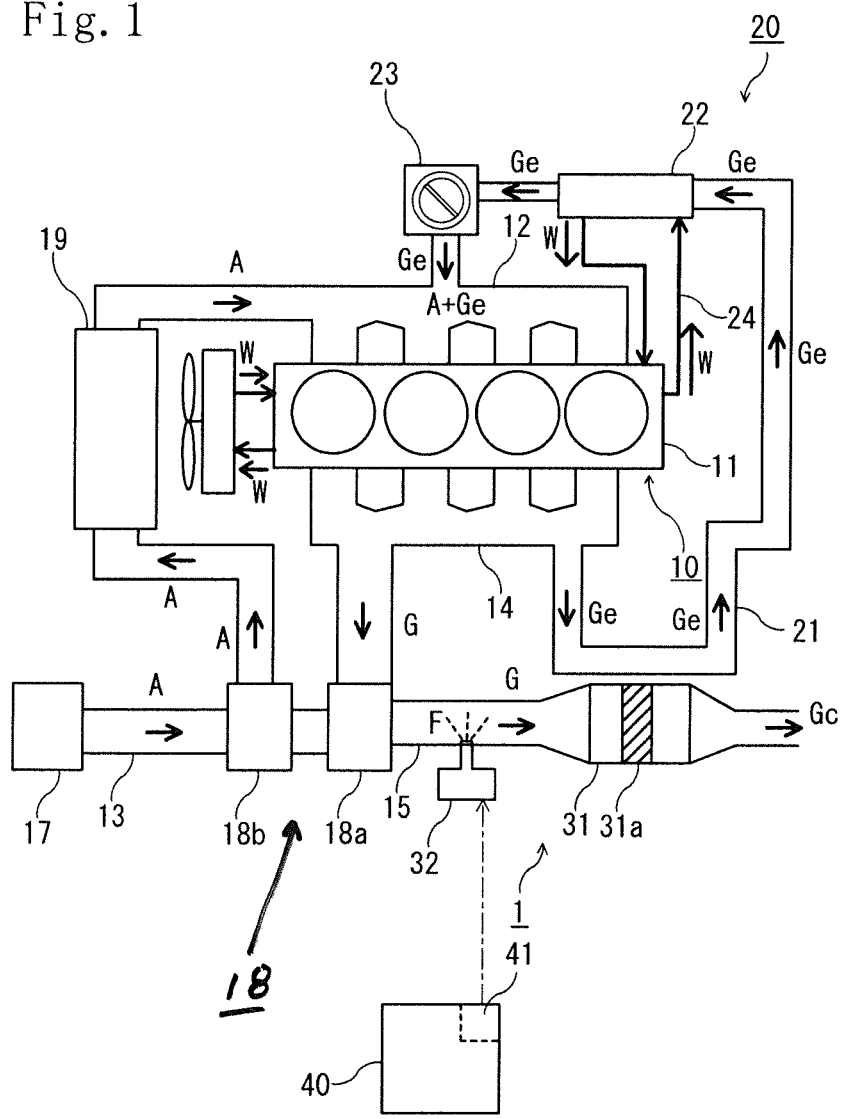
FIG. 1 is a view showing a configuration of an exhaust gas purification system of an embodiment according to the present invention.

Hereinafter, an exhaust gas purification system and an exhaust gas purification method of an embodiments according to the present invention are described with reference to the drawings. As shown in FIG. 1, an engine (internal combustion engine) 10 equipped with an exhaust gas purification system 1 of a first embodiment of the present invention includes an engine main body 11, an intake passage 13, and an exhaust passage 15.

In the intake passage 13 connected to an intake manifold 12 of the engine main body 11, an air cleaner 17, a compressor 18b of a turbocharger 18, and an intercooler 19 are provided in this order from an upstream side. Meanwhile, in the exhaust passage 15 connected to an exhaust manifold 14 of the engine main body 11, a turbine 18a of the turbocharger 18 is provided in this order from the upstream side.

In addition, the engine 10 is equipped with an exhaust gas recirculation ("EGR") system 20 and the exhaust gas purification system 1 including an exhaust gas purification device 31 provided in the exhaust passage 15.

The EGR system 20 includes an EGR passage 21 connecting the intake manifold 12 and the exhaust manifold 14 to each other, and also includes an EGR cooler 22 and an EGR valve 23 provided in this EGR passage 21 in this order from the upstream side.

This EGR cooler 22 is a device configured to perform heat exchange between EGR gas Ge and engine coolant water W. The EGR gas Ge is cooled by this heat exchange to reduce the volume of the EGR gas Ge, so that the air intake efficiency is improved.

On the other hand, the exhaust gas purification system 1 includes the exhaust gas purification device 31 disposed in the exhaust passage 15 and configured to perform a treatment for purifying NOx (nitrogen oxides), PM (particulate matter), and the like contained in exhaust gas G generated by the combustion reaction in the engine main body 11. The exhaust gas Gc subjected to the purification treatment is released to the atmosphere through a muffler (not illustrated) or the like. This exhaust gas purification device 31 includes a combination of a NOx storage reduction-type catalyst device (LNT: catalyst device) 31a, an oxidation catalyst device (DOC) (not illustrated), a selective reduction-type catalyst device (SCR) (not illustrated), and the like.

When a vehicle travels normally, i.e., when the air-fuel ratio of the exhaust gas G is in a lean state, this NOx storage reduction-type catalyst device 31a oxidizes NO contained in the exhaust gas G to $NO_2$, and stores the $NO_2$. When the amount of NOx stored approaches a storage limit, an air-fuel ratio richness control for placing the air-fuel ratio of the exhaust gas G in a rich state is performed to release the amount of NOx stored and also reduce the released NOx.

To place the air-fuel ratio of the exhaust gas G in a rich state in the air-fuel ratio richness control, post injection is conducted based on in-cylinder fuel injection, or fuel F is directly injected into the exhaust gas G from a fuel injection device 32 provided in the exhaust passage 15. In this manner, the amount of HCs in the exhaust gas G is increased temporarily, and the HCs are combusted with oxygen in the exhaust gas G to place the exhaust gas G in a rich state.

In addition, a controlling device 41 configured to perform the air-fuel ratio richness control on the NOx storage reduction-type catalyst device 31a is provided. This controlling device 41 is generally integrated in an entire system-controlling device 40 configured to control the entirety of the engine 10 or the entirety of a vehicle on which the engine 10 is mounted.

In the present invention, the controlling device 41 is configured as follows. Specifically, when the catalyst temperature T is at or below a preset lower limit catalyst temperature Tc, the air-fuel ratio richness control is prohibited. With this, when a first timing ti1 where an estimated value V of the NOx storage amount has reached a preset enrichment start threshold value Vc and a second timing ti2 based on a set interval time (enrichment start time threshold value) tic set in an enrichment interval time map M1 are both satisfied, the air-fuel ratio richness control is started.

Figure 2:
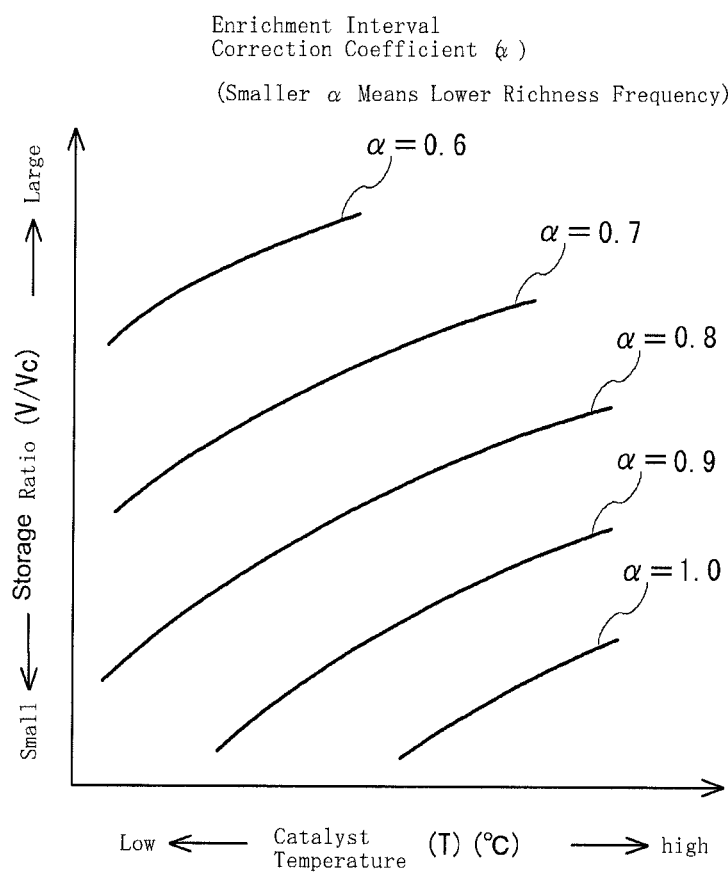
FIG. 2 is a graph schematically showing the enrichment interval correction coefficient based on a catalyst temperature and on a storage ratio of an estimated value of a NOx storage amount to an enrichment start threshold value of the NOx storage amount used in an exhaust gas purification method of the embodiment according to the present invention.

In addition, an enrichment interval correction coefficient α is preset based on the catalyst temperature T of the NOx storage reduction-type catalyst device 31a and on a storage ratio R (=V/Vc) of the estimated value V of the NOx storage amount to the enrichment start threshold value Vc of the NOx storage amount, and the second timing ti2 is corrected by multiplying the set interval time tic by the enrichment interval correction coefficient α. In other words, ti2=tic×α. The enrichment interval correction coefficient α is set to be smaller as the catalyst temperature T gets lower, and set to be larger as the storage ratio R gets smaller, as exemplified in FIG. 2.

Figure 3:
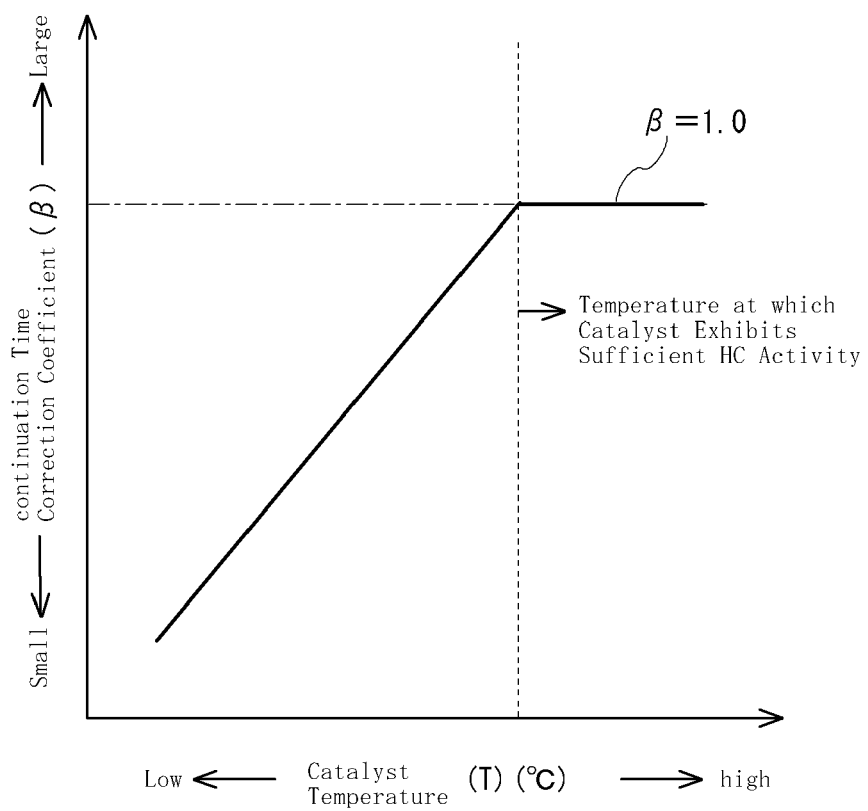
FIG. 3 is a graph schematically showing a continuation time correction coefficient against the catalyst temperature used in the exhaust gas purification method of the embodiment according to the present invention.
Figure 4:
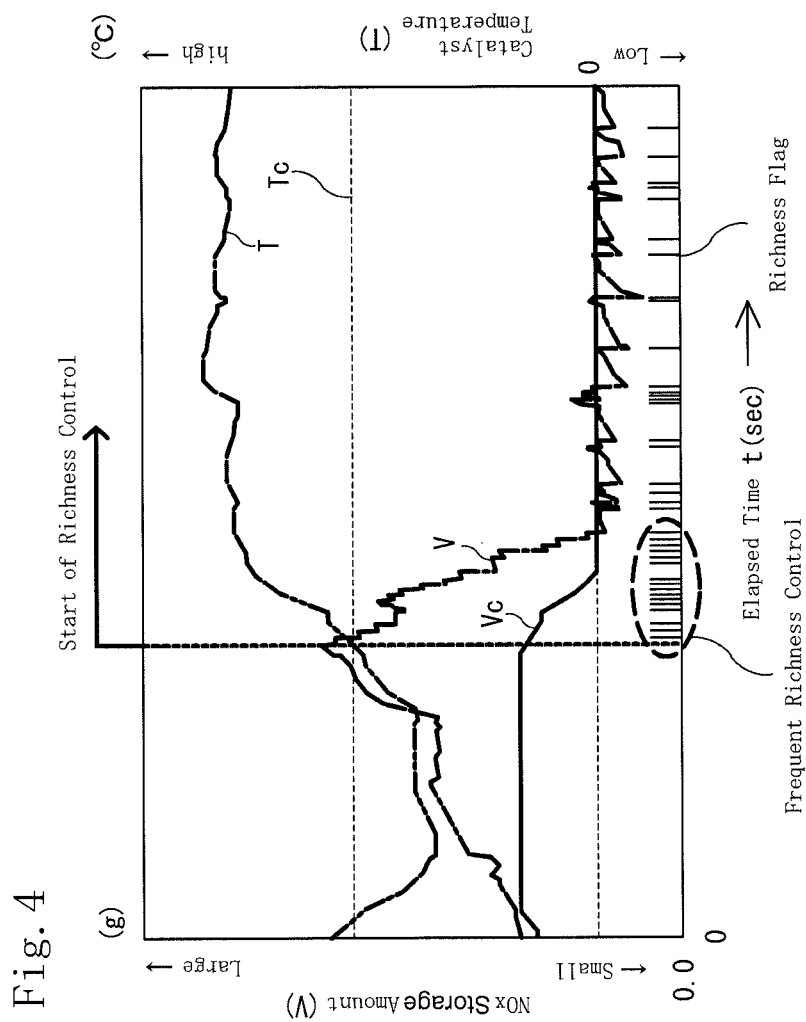
FIG. 4 is a graph schematically showing a time series of an estimated catalyst temperature, a NOx storage amount, a NOx storage amount threshold value (enrichment start threshold value), and rich flags, after ignition of an engine, for describing a problem of a conventional technology.

In addition, when a continuation time to for which the rich state is continued after the start of the air-fuel ratio richness control satisfies both a third timing tea where the estimated value V of the NOx reduction amount has reached an enrichment finish threshold value Ve and a fourth timing te4 where a set continuation time tec specified in an enrichment continuation time map M2 has elapsed, the air-fuel ratio richness control is finished. In addition, the fourth timing te4 is corrected by multiplying the set continuation time tec by a continuation time correction coefficient β set according to the catalyst temperature T. In other words, te4=tec×β. As exemplified in. FIG. 3, the continuation time correction coefficient β is set to be larger as the catalyst temperature T gets lower.

Next, an exhaust gas purification method performed in the above-described exhaust gas purification system 1 is described. The exhaust gas purification method of the embodiment of the present invention is an exhaust gas purification method, in which a purification capacity of a catalyst in a NOx storage reduction-type catalyst device 31a provided in an exhaust passage 15 of an engine 10 is recovered by an air-fuel ratio richness control. In the exhaust gas purification method, the air-fuel ratio richness control is prohibited, when a catalyst temperature T is at or below a preset lower limit catalyst temperature Tc.

With this, when the first timing ti1 where the estimated value V of the NOx storage amount has reached the preset enrichment start threshold value Vc and the second timing ti2 based on the set interval time tic set in an enrichment interval time map M1 are both satisfied, the air-fuel ratio richness control is started. In addition, the second timing ti2 is corrected by multiplying the set interval time tic by an enrichment interval correction coefficient α. Here, the enrichment interval correction coefficient α is preset based on the catalyst temperature T of the NOx storage reduction-type catalyst device 31a and on a storage ratio R (=V/Vc) of the estimated value V of the NOx storage amount to the enrichment start threshold value Vc of the NOx storage amount, and is set to be larger as the catalyst temperature T gets lower, and to be larger as the storage ratio R gets smaller, as exemplified in FIG. 2. In other words, ti2=tic×α.

In addition, when the continuation time to for which the rich state is continued after the start of the air-fuel ratio richness control satisfies both the third timing te3 where the estimated value V of the NOx reduction amount has reached the enrichment finish threshold value Ve and the fourth timing te4 where the set continuation time tec specified in an enrichment continuation time map M2 has elapsed, the air-fuel ratio richness control is finished. In addition, the fourth timing te4 is corrected by multiplying the set continuation time tec by a continuation time correction coefficient β set according to the catalyst temperature T, specifically, set to be larger as the catalyst temperature T gets lower, as exemplified in FIG. 3. In other words, te4=tec×β.

According to the exhaust gas purification system 1 and the exhaust gas purification method configured as described above, the enrichment interval correction coefficient α based on the catalyst temperature T of the NOx storage reduction-type catalyst device 31a and on the storage ratio R (=V/Vc) of the estimated value V of the NOx storage amount to the enrichment start threshold value Vc is introduced in the exhaust gas purification system 1 in which the purification capacity of the NOx storage reduction-type catalyst supported in the NOx storage reduction-type catalyst device 31a is recovered by the air-fuel ratio richness control. This introduction makes it possible to perform the air-fuel ratio richness control at an enrichment interval ti optimized based on mutual relationships among the estimated value V of the NOx storage amount, the catalyst temperature T, and the enrichment interval ti, without performing determinations related to the estimated value V of the NOx storage amount, the catalyst temperature T each independently.

Moreover, the introduction of the continuation time correction coefficient β set according to the catalyst temperature T makes it possible to optimize the continuation time te, for which the rich state is continued, according to the catalyst temperature T of the NOx storage reduction-type catalyst device 31a and the reaction rate of the catalyst which depends on the catalyst temperature T, so that the air-fuel ratio richness control can be performed more appropriately.

Consequently, more appropriate determination criteria according to the operation state of the engine 10 can be provided for determining the start or finish of the air-fuel ratio richness control in the exhaust gas purification system 1 including the NOx storage reduction-type catalyst device 31a configured to recover the purification capacity of the catalyst by the air-fuel ratio richness control. This makes it possible to reduce the frequency of the air-fuel ratio richness control and raise the catalyst temperature T, while preventing the white smoke development and the HC slip. As a result, improvement in exhaust gas composition and improvement in fuel efficiency can be achieved.

The invention claimed is:
1. An exhaust gas purification system, comprising:
a catalyst device provided in an exhaust passage of an internal combustion engine and configured to recover a purification capacity of a catalyst by an air-fuel ratio richness control; and
an electronic controller programmed to execute control of the air-fuel ratio richness control by—
prohibiting the air-fuel ratio richness control, when a catalyst temperature is at or below a preset lower limit catalyst temperature, starting the air-fuel ratio richness control, when a first timing where an estimated value of an NOx storage amount has reached a preset enrichment start threshold value and a second timing based on a set interval time set in an enrichment interval time map are both satisfied, presetting an enrichment interval correction coefficient based on the catalyst temperature of the catalyst device and on a storage ratio of the estimated value of the NOx storage amount to an enrichment start threshold value of the NOx storage amount, and correct the second timing by multiplying the set interval time by the enrichment interval correction coefficient, and setting the enrichment interval correction coefficient to be larger as the catalyst temperature gets lower, and to be larger as the storage ratio gets lower.

2. An exhaust gas purification system, comprising:

a catalyst device provided in an exhaust passage of an internal combustion engine and configured to recover a purification capacity of a catalyst by an air-fuel ratio richness control; and an electronic controller programmed to execute control of the air-fuel ratio richness control by— prohibiting the air-fuel ratio richness control, when a catalyst temperature is at or below a preset lower limit catalyst temperature, starting the air-fuel ratio richness control, when a first timing where an estimated value of an NOx storage amount has reached a preset enrichment start threshold value and a second timing based on a set interval time set in an enrichment interval time map are both satisfied, finishing the air-fuel ratio richness control, when a continuation time for which the rich state is continued after the starting of the air-fuel ratio richness control satisfies both a third timing where an estimated value of an NOx reduction amount has reached an enrichment finish threshold value and a fourth timing where a set continuation time specified in an enrichment continuation time map has elapsed, and correcting the fourth timing by multiplying the set continuation time by a continuation time correction coefficient set according to the catalyst temperature.

3. An exhaust gas purification method, in which a purification capacity of a catalyst in a catalyst device provided in an exhaust passage of an internal combustion engine is recovered by an air-fuel ratio richness control, the method comprising:

prohibiting the air-fuel ratio richness control, when a catalyst temperature is at or below a preset lower limit catalyst temperature;

starting the air-fuel ratio richness control, when a first timing where an estimated value of an NOx storage amount has reached a preset enrichment start threshold value and a second timing based on a set interval time set in an enrichment interval time map are both satisfied;

correcting the second timing by multiplying the set interval time by an enrichment interval correction coefficient preset based on the catalyst temperature of the catalyst device and on a storage ratio of the estimated value of the NOx storage amount to an enrichment start threshold value of the NOx storage amount; and setting the enrichment interval correction coefficient to be larger as the catalyst temperature gets lower, and to be larger as the storage ratio gets lower.

4. An exhaust gas purification method, in which a purification capacity of a catalyst in a catalyst device provided in an exhaust passage of an internal combustion engine is recovered by an air-fuel ratio richness control, the method comprising:

prohibiting the air-fuel ratio richness control, when a catalyst temperature is at or below a preset lower limit catalyst temperature;

starting the air-fuel ratio richness control, when a first timing where an estimated value of an NOx storage amount has reached a preset enrichment start threshold value and a second timing based on a set interval time set in an enrichment interval time map are both satisfied;

finishing the air-fuel ratio richness control, when a continuation time for which the rich state is continued after the starting of the air-fuel ratio richness control satisfies both a third timing where an estimated value of a NOx reduction amount has reached an enrichment finish threshold value and a fourth timing where a set continuation time specified in an enrichment continuation time map has elapsed; and correcting the fourth timing by multiplying the set continuation time by a continuation time correction coefficient set according to the catalyst temperature.

* * * * *